United States Patent [19]

Gaudin

[11] Patent Number: 4,783,890
[45] Date of Patent: Nov. 15, 1988

[54] METHOD OF REPAIRING A STEAM GENERATOR TUBE BY MEANS OF LINING

[75] Inventor: Jean-Paul Gaudin, Chassieu, France

[73] Assignee: Framatome, Courbevoie, France

[21] Appl. No.: 845,147

[22] Filed: Mar. 27, 1986

[30] Foreign Application Priority Data

Mar. 29, 1985 [FR] France .................................. 85 04835

[51] Int. Cl.⁴ .............................................. B23P 6/00
[52] U.S. Cl. ............................ 29/402.16; 29/157.3 C; 29/402.09; 29/523
[58] Field of Search ............ 29/402.01, 402.09, 402.14, 29/402.19, 402.16, 522 R, 523, 157.3 C; 228/2.5, 107, 108, 109, 119, 175

[56] References Cited

U.S. PATENT DOCUMENTS

| | | | |
|---|---|---|---|
| Re. 30,802 | 11/1981 | Rogers, Jr. | 29/402.09 |
| 3,140,537 | 7/1964 | Popoff | 228/108 |
| 3,562,887 | 2/1971 | Schroeder et al. | 228/2.5 |
| 3,912,148 | 10/1975 | Johnson | 228/2.5 |
| 4,028,789 | 6/1977 | Loch | 29/402.16 |
| 4,448,343 | 5/1984 | Kochka et al. | 228/119 |
| 4,547,944 | 10/1985 | Hayden | 29/402.16 |
| 4,581,801 | 4/1986 | Kobuck et al. | 29/402.09 |

FOREIGN PATENT DOCUMENTS 0005256 1/1980 Japan ................................ 29/402.19

Primary Examiner—Howard N. Goldberg
Assistant Examiner—Irene Cuda
Attorney, Agent, or Firm—Pollock, Vande Sande & Priddy

[57] ABSTRACT

Method of repairing a steam generator tube by means of a liner, in which the mechanical deformation (19) of the liner (15), by expansion in its end part opposite the expanded end (16) inside the tube plate (11), is located at a limited height, and the parameters of the mechanical deformation (19) are calculated in accordance with the welding parameters subsequently applied. These parameters are determined in accordance with the parameters of the initial mechanical deformation (19) so as to obtain relief of the stresses more particularly in the critical zones (19a, 19b) of the mechanical deformation.

2 Claims, 2 Drawing Sheets

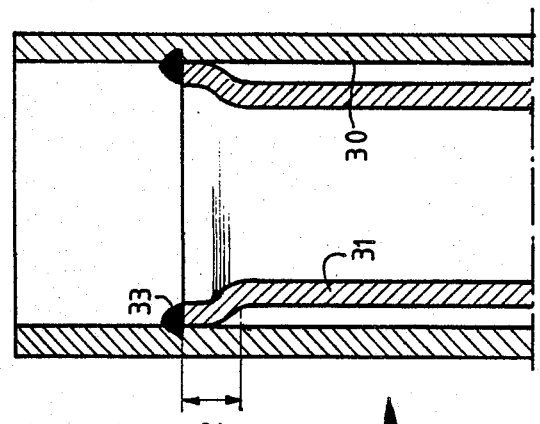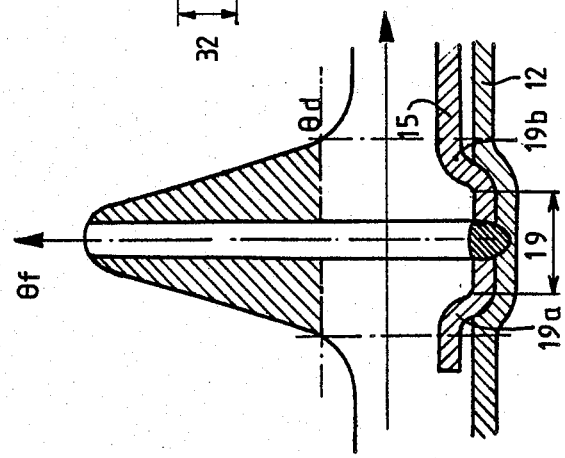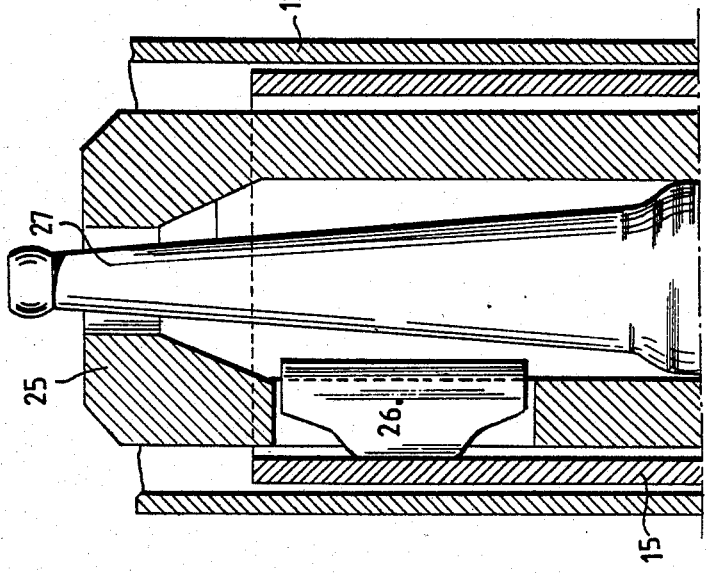

METHOD OF REPAIRING A STEAM GENERATOR TUBE BY MEANS OF LINING

FIELD OF THE INVENTION

The invention relates to a method of repairing a tube of a steam generator by means of lining.

BACKGROUND OF THE INVENTION

The steam generators of pressurized-water nuclear reactors have a bundle of tubes, the ends of which are expanded inside a tube plate of considerable thickness. The high-pressure and high-temperature primary water of the reactor which comes into contact with the fuel assemblies of the core flows inside the tubes of the bundle in order to heat and vaporize the feed water brought into contact with the external wall of the tubes, inside the casing of the steam generator.

The tubes of the bundle lie flush with one of the sides of the plate, called the inlet side, where the primary water enters and leaves the bundle in two distinct zones, and emerge from this tube plate, so as to penetrate the bundle casing, on its other side called the outlet side.

The walls of the tubes in the bundle thus form a barrier between the primary fluid containing activated particles and the feed water to be vaporized, the steam from which is passed to the turbine associated with the nuclear reactor. Therefore, the appearance of leaks in the tubes of the bundle inside the steam generator must be avoided as far as possible, and the tubes must be repaired as quickly as possible and effectively when their walls are pierced.

Due to the temperature gradients and mechanical stresses resulting from the differences in pressure and different forms of corrosion which may appear inside the steam generator, both on the primary side and on the secondary side, during use of the steam generator, the life of which must be equal to that of the other parts of the reactor, fractures may appear in the tubes, giving rise to leaks, and repairs must be carried out during maintenance of the reactor.

Until now, one of the most commonly used methods consisted in making the defective tube inoperative by means of a plug fixed to the end of the tube located in the vicinity of the inlet side of the tube plate, in the part which receives the primary water coming from the reactor core. This known method is fairly reliable, but has the drawback that it reduces the exchange area of the steam generator, to an extent which increases with the number of bundle tubes which have to be rendered inoperative.

Methods of repairing the tubes of the bundle in a steam generator have therefore been devised, consisting in lining these tubes at the point where the defect giving rise to a loss of fluid tightness occurs. A tubular liner with an external diameter slightly less than the internal diameter of the tube to be repaired and of sufficient length to cover the defect is introduced into the tube through the inlet side of the tube plate and placed inside this tube plate and inside the tube so as to lie flush with the inlet side. This liner is then fixed by means of diametrical expansion inside the tube.

For example, the suggestion has been made to achieve this expansion by means of a hydraulic chuck, but the mechanical behavior and fluid-tightness of the repaired tube have proved insufficient.

The suggestion has also been made to improve fixing of the liner by expanding it inside the tube.

The expanding operation results in rolling of the liner inside the tube and hence in a reduction in its thickness.

The suggestion has therefore been made to braze the liner inside the tube after hydraulic or mechanical expansion of the top and bottom of the said liner. Diametrical expansion of the liner inside the tube is performed hydraulically or mechanically in a zone of this liner located above the tube plate on the secondary side. Fixing is completed by melting a brazing material introduced beforehand between the external surface of the liner and the internal surface of the tube in the zone being expanded.

However, brazing poses certain problems in particular as regards distribution and homogeneity; reliability is limited as regards fluid-tightness, and the operation is complex and made more difficult by the need to provide an integrated brazing joint, associated with a brazing flux. This is why it is generally preferred to fix the liner, after deformation of the latter, by means of welding inside the tube.

In this process, the bottom end of the liner lying flush with the inlet side of the tube plate is first fixed to the inside of the tube by means of expansion, so as to form a metallurgical bond, strengthened by a peripheral welding bead.

Upper diametrical expansion of the liner inside the tube is then performed in a second zone of this liner, above the tube plate. The mechanical fixing is completed by welding the liner inside the tube, in the region of the deformed zone, thereby achieving tightness at the same time.

Using this method, it is possible to ensure mechanical fixing and satisfactory tightness of the liner inside the tube, but the deformation is generally performed over a large area of the liner, thereby giving rise to considerable internal stresses, in particular in the crucial zones, i.e., in the zones located on either side of the deformation, which may subsequently promote corrosion, in particular stress or tensile corrosion.

SUMMARY OF THE INVENTION

The object of the invention, therefore, is to propose a method of repairing, by means of lining, a tube of a steam generator with a tube bundle and a tube plate inside which the tubes of the bundle are expanded, from the inlet side of the tube plate with which the ends of the tubes lie flush as far as the outlet side where the tubes penetrate the housing of the steam generator, consisting in introducing into the tube to be repaired, on the inlet side of the tube plate, a tubular liner with an external diameter slightly less than the internal diameter of the tube and of suitable length for the repair to be performed, in fixing the liner by means of expansion inside the tube, in a first zone close to its end, in the vicinity of the inlet side of the tube plate, and in fixing the liner inside the tube, in a second zone above the tube plate, by effecting a mechanical deformation, by means of expansion, followed by welding of the liner inside the tube.

According to the invention, the mechanical deformation of the liner, achieved by means of expansion of its end part opposite the end expanded inside the tube plate, is located at a limited height and the parameters of the said mechanical deformation are calculated in accordance with the welding parameters subsequently applied, the said welding parameters being determined in accordance with the parameters of the initial mechanical deformation so as to obtain relief of the stresses, more particularly in the crucial zones of the mechanical deformation.

BRIEF DESCRIPTION OF THE DRAWINGS

In order that the invention may be more clearly understood, a description now follows, by way of a example, with reference to the attached drawings, of a repair carried out by means of lining, on a tube of a steam generator of a pressurized-water nuclear reactor, in the case of a method according to the prior art and in the case of the method according to the invention, as well as a description of the means used during the operation performed using the method according to the invention.

FIG. 3 is a sectional view showing the end part of the liner during expansion inside the tube;

FIG. 4 is a diagram showing the profile of welding temperatures as a function of the distances for a given material; and FIG. 5 is a sectional view, through a plane of symmetry, of a second embodiment of the invention.

DESCRIPTION OF PREFERRED EMBODIMENT

Figure 1:
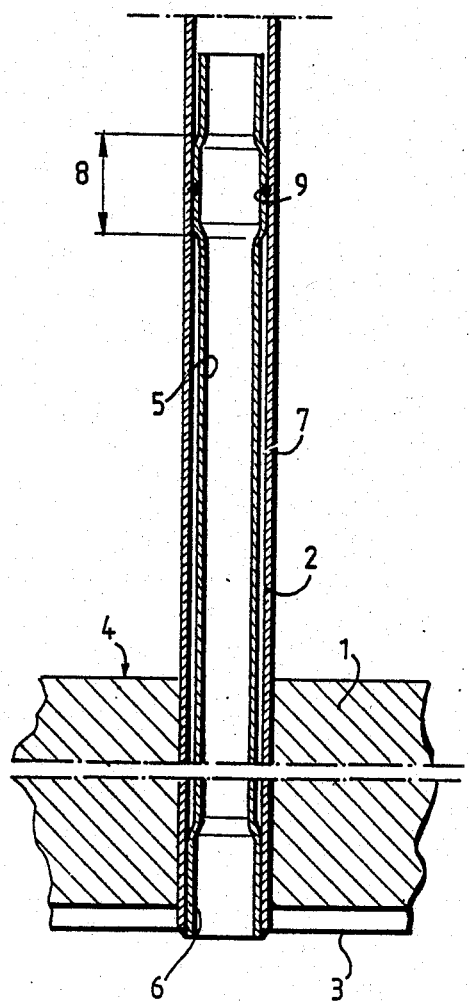
FIG. 1 is a sectional view, through a plane of symmetry, of a part of the tube plate and of a tube inside which a repair by means of lining has been carried out using a method according to the prior art.

FIG. 1 shows a tube plate 1 of considerable thickness (of the order of 0.60 m) inside which a tube 2 is expanded, throughout the thickness of the tube plate, between its inlet side 3 and its outlet side 4. The external diameter of the tube and the diameter of the opening passing through the tube plate inside which this tube is expanded are of the order of 0.022 m. The internal diameter of the tube is of the order of 0.020 m.

After a certain period of operation of the steam generator, the tube 2 had a small crack 7 in its part located outside the tube plate 1. A repair was therefore carried out using a liner 5, the nominal external diameter of which is 0.19 m and the internal diameter of which is 0.017 m.

The liner 5 is introduced inside the tube until its bottom part lies flush with the bottom part of the tube 2, level with the inlet side 3 of the tube plate 1. A part 6 of this end of the liner in the tube is then expanded inside the tube plate 1. This expanding operation has the effect of producing a metal connection between the wall of the liner and the wall of the tube 2 inside the tube plate 1.

A mechanical deformation is also produced by expanding the liner 5 in a second zone 8 of this liner, inside the tube, but above the tube plate 1.

To date, in order to obtain satisfactory fixing of liner 5 inside the tube 2, the deformation was produced in the zone 8 at a relatively significant height, of the order of 0.05 m, and fixing was then completed by means of a weld 9 in the middle part of the zone 8 independently of the parameters applied at the time deformation was carried out.

Figure 2:
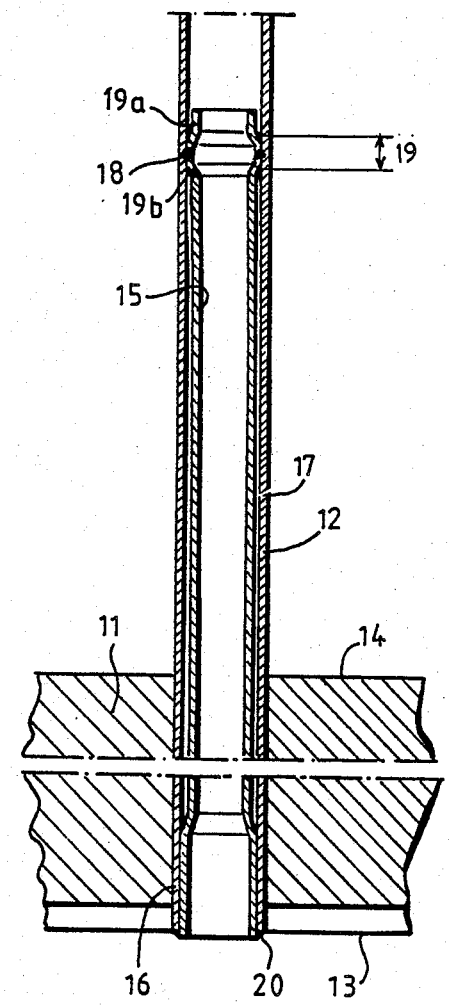
FIG. 2 is a sectional view, through a plane of symmetry similar to FIG. 1, in the case of the lining method according to the invention.

Reference will now be made to FIGS. 2 and 3 for a description of an operation involving lining of a tube in accordance with the method of the invention.

A tube 12 with an external diameter of 0.0222 m is expanded inside the plate 11 of a steam generator of a pressurized-water nuclear reactor between the inlet side 13 and the outlet side 14 of this thick tube plate.

A crack 17 has appeared in the wall of the tube 12 during operation within the steam generator.

A repair is carried out by introducing inside the tube 12, from the inlet side 13 of the tube plate, a liner 15, the external diameter of which is slightly less than the internal diameter of the tube 12 so that the said liner slides without friction.

The length of the liner 15 has been chosen so that, when this liner is introduced inside the tube, as shown in FIG. 2, the crack 17 is covered by this liner 15. The bottom end of liner 15 lies flush with the bottom end of the tube 12, which itself lies substantially flush with the inlet side 13 of the tube plate.

Mechanical fixing is then performed by expanding the bottom part 16 of the liner 15 inside the tube 12. Fluid-tightness of the tube at its end lying flush with the inlet side 13 of the tube plate is ensured by a weld 20.

A mechanical deformation is then produced in a zone 19 of the end part of the liner 15 by means of localized expansion such as that shown in FIG. 3.

FIG. 3 shows the end of the liner 15 inside the tube 12 where the expander 25 is placed, in the working position, this expander having three rollers 26, only one of which is shown in FIG. 3. The rollers 26 can be made to rotate and push outwards in a perfectly precise manner by means of a conical rod 27. By moving the rod 27 forward, it is possible to control exactly the diametrical expansion of the end of the liner 15.

As can be seen in FIG. 3, the rollers 26 are located in a slightly retracted position in relation to the end of the liner 15 and have an external shape corresponding to the shape of the deformation to be produced on the liner 15.

The expansion parameters of the liner 15 and of the tube 12, during the expansion operation, are adjusted so that, after the liner 15 has been arranged in position by means of diametrical expansion in the plastic range, they cause very slight expansion of the tube 12 in the elastic range.

After removal of the expander 25, the tube 12 therefore retracts in the diametrical direction and ensures gripping of the end part 19 of the liner 15 deformed in the plastic range.

Fixing of the liner 15 inside the tube 12 is then completed, and fluid tightness is ensured by means of a weld 18 causing fusion of the liner 15 located in the deformed central part and partial fusion of the tube 12.

However, in order to obtain perfect fluid-tightness in the zone 19, during welding, it is necessary to obtain relief of the stresses resulting from the initial mechanical deformation in the critical zones 19a and 19b (FIG. 2), i.e., in the zones located on either side of the deformation.

In order to achieve this, the deformation in the zone 19 is located at a reduced height and the parameters applied during this deformation, in particular the expanding force which gives rise to an interface pressure between the liner 15 and the tube 12, are determined in accordance with the welding parameters applied subsequently.

On the other hand, the welding parameters are determined in such a way that, taking into account the parameters associated with the initial deformation, the temperature reached in the crucial zones 19a and 19b is such that it exceeds the threshold of the temperature at which the stresses in the said crucial zones of the material in question are relieved.

In this manner, the stresses in the deformed zone are therefore relieved so as to avoid promoting stress corrosion.

With reference to FIG. 4, there now follows a description of an example of embodiment of the method.

FIG. 4 is a diagram showing the profile of the welding temperatures as a function of the distances for a given material.

Assuming that the material forming the liner 15 and the tube 12 is, for example, a nickel/chromium alloy with a very high resistance to corrosion, a mechanical deformation is then produced in the zone 19, by means of expansion, at a limited height which is, for example, between 4 and 15 mm. The liner 15 is deformed plastically, while the tube 12 is deformed solely in the elastic range. In FIG. 4 the deformations produced on the liner and the tube have obviously been exaggerated.

In the deformed central part 19, the welding bead produced has a width of between 4 and 8 mm.

The welding parameters are therefore determined so that the temperature in the region of the weld 18 is substantially equal to the melting temperature of the alloy of which the liner and tube are made, i.e., $\theta f \simeq 1,400°$ C., and also so that the temperature reached in the crucial zones 19a and 19b is higher than the stress-relieving temperature which is:

$$\theta d \simeq 550° \text{ C.}$$

As shown by the graph in FIG. 4, a temperature profile is established in the entire deformed zone, causing the stresses in the said deformed zone, including those in the critical zones, to be relieved.

Two operations are therefore performed in succession, the parameters of which are closely linked to each other.

In this manner, perfect assembly and fluid-tightness are achieved, while isolating the defective part of the tube.

FIG. 5 shows another embodiment of the invention.

In this case, a liner 31 is introduced, as before, inside the tube 30 to be repaired, and a mechanical deformation is produced, by means of expansion, in a zone 32 located at the end top part of the liner. A fillet weld 33 is also formed on the end of the liner. This arrangement makes it possible, moreover, to eliminate the dead zone and the gap between the end of the liner and the tube, while relieving the stresses in the single remaining critical zone.

The repair method according to the invention can be applied not only to steam generators of pressurized-water reactors, but also to any steam generator with a tube bundle, the ends of which are expanded inside a tube plate and are likely to be damaged in a zone outside this tube plate.

I claim:

1. Method of repairing, by means of lining, a tube (12, 30) of a steam generator with a tube bundle and a tube plate (11) inside which the tubes (12, 30) of the bundle are expanded, from the inlet side (13) of the tube plate (11) with which the ends of the tube (12) lie flush as far as the outlet side (14) where the tubes penetrate the housing of the steam generator, said method comprising the steps of
    (a) introducing into the tube (12, 20) to be repaired, on the inlet side (13) of the tube plate (11), a tubular liner (15, 31) with an external diameter slightly less than the internal diameter of the tube (12, 30) and of suitable length for the repair to be performed;
    (b) fixing the liner (15, 31) by means of expansion inside the tube (12, 30) in a first zone close to its end, in the vicinity of the inlet side (13) of the tube plate (11); and
    (c) fixing the liner (15, 31) inside the tube (12, 30), in a second zone outside the tube plate (11), by effecting an initial mechanical deformation (19, 32), by means of expansion, followed by a weld (18, 33) between the liner and the tube;
    (d) said mechanical deformation (19, 32) of the liner (15, 31), achieved by means of expansion of its end part opposite the end (16) expanded inside the tube plate (11), being located at a limited height;
    (e) the parameters of said mechanical deformation (19, 32) being calculated in accordance with the welding parameters subsequently applied; and
    (f) said welding parameters being so determined that the temperature reached in critical zones (19a, 19b), by means of conduction from a fusion zone, exceeds the temperature at which stresses in said critical zones are relieved, thereby relieving stresses in zones subjected to said deformation.

2. Method according to claim 1, in which the mechanical deformation (32) is located at the end top part of the liner (31) so as to form a fillet weld (33), while relieving stresses in a single remaining critical zone.

* * * * *